Jan. 11, 1966      H. C. EBERLINE      3,229,090
HIGH LEVEL REMOTE RADIATION MONITOR
Filed June 1, 1961      2 Sheets-Sheet 1
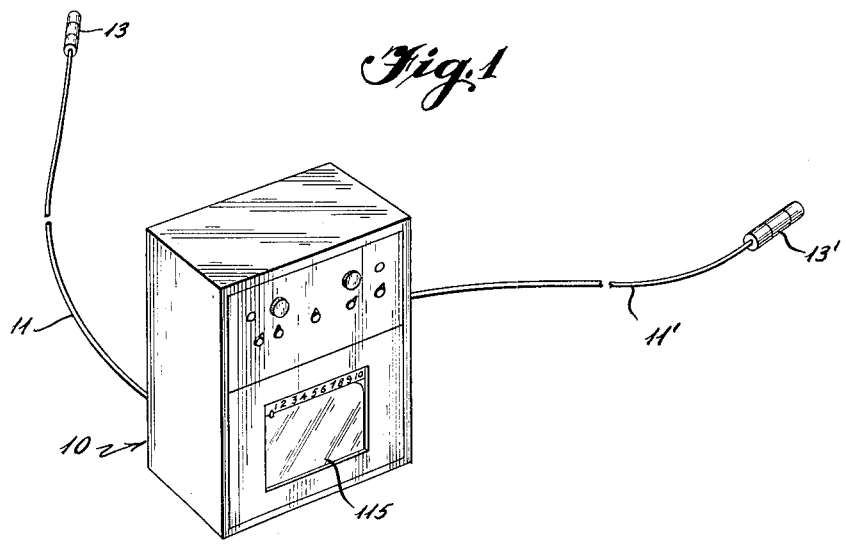
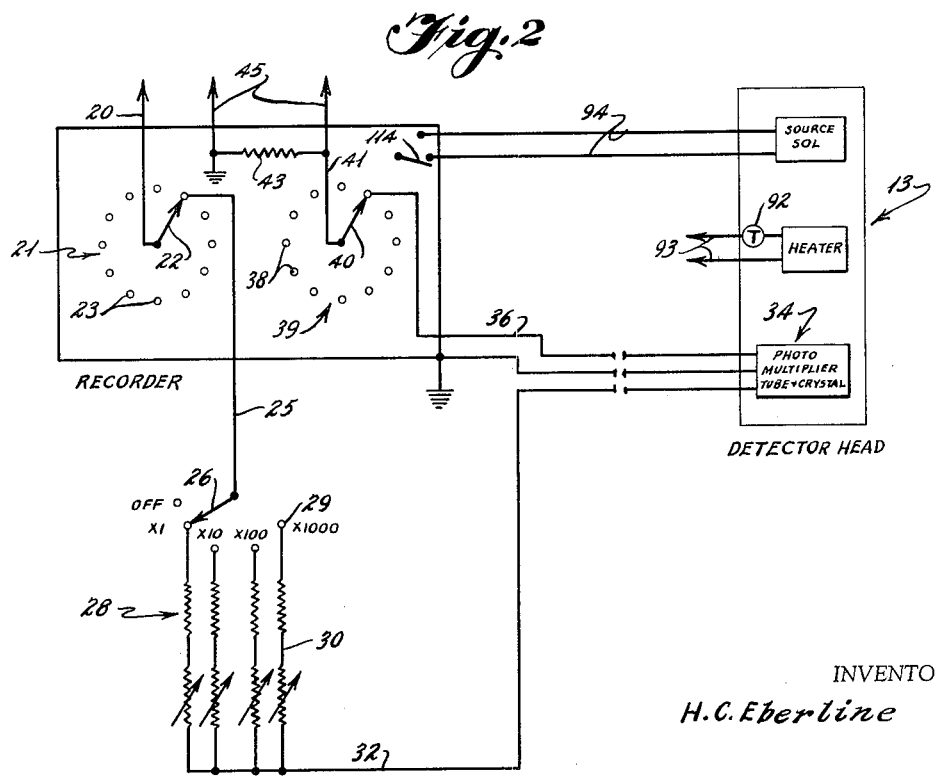
INVENTOR
H.C. Eberline
BY
ATTORNEYS Jan. 11, 1966  H. C. EBERLINE  3,229,090
HIGH LEVEL REMOTE RADIATION MONITOR
Filed June 1, 1961  2 Sheets-Sheet 2
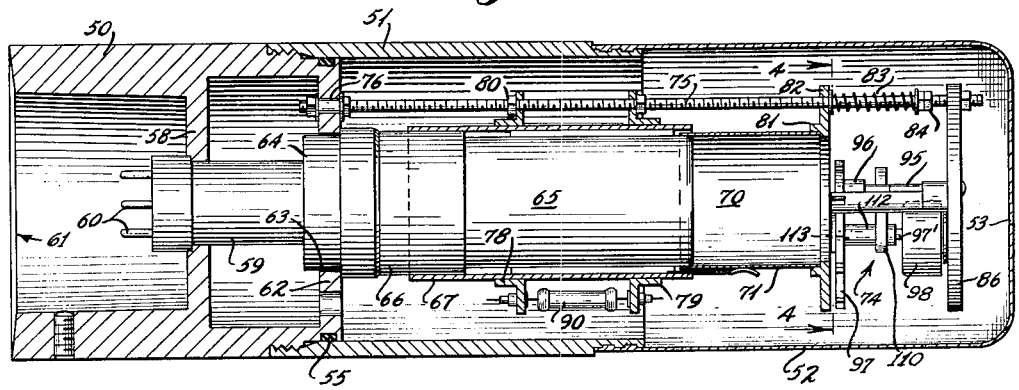
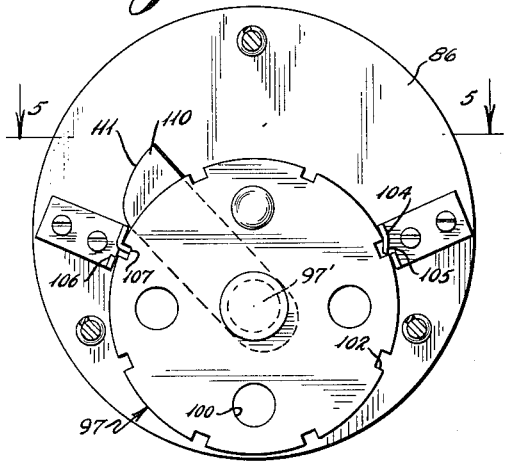
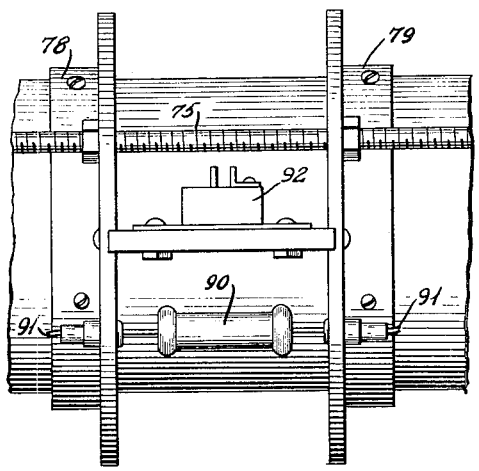
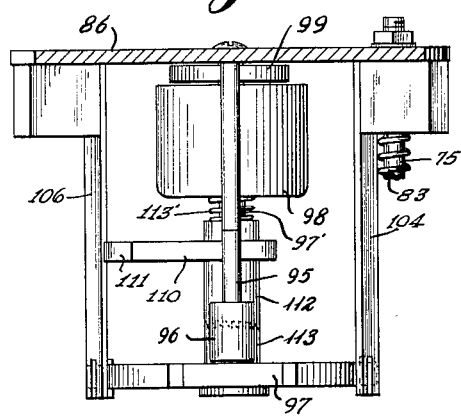
INVENTOR
H.C. Eberline
BY
ATTORNEY

United States Patent Office 3,229,090
Patented Jan. 11, 1966

3,229,090
HIGH LEVEL REMOTE RADIATION MONITOR
Howard C. Eberline, Santa Fe, N. Mex., assignor to Eberline Instrument Corporation, Santa Fe, N. Mex., a corporation of New Mexico
Filed June 1, 1961, Ser. No. 114,233
5 Claims. (Cl. 250—71.5)

This invention relates to the detection of radiation and more particularly to a monitor adapted continuously to indicate and record radiation levels at a multiplicity of spaced locations.

In the monitoring of radiation it may be necessary to locate detectors in inaccessible areas at relatively great distances from the recorder and which are exposed to different temperature conditions.

Among the limitations accompanying the use of scintillation detectors has been the drift inherently occurring in photomultiplier tubes if they are operated continuously for any substantial length of time. Another limitation in remotely located detection and monitoring equipment has been been the necessity for compensating for the variation in signal or voltage drop between the detector and the recording device.

Another problem with remote monitoring equipment is that of checking the operation at frequent intervals in order that any malfunction may be immediately known.

Accordingly, it is an object of the present invention to provide a radiation monitor adapted substantially constantly to indicate and record radiation levels in a multiplicity of spaced areas.

A further object is the provision of a radiation monitor having a high order of accuracy and which may be used for detecting equipment located at relatively great distances.

A further object is to provide a radiation monitor which may be used for an indefinite period without producing drift of the photomultiplier and which has provision for compensating for variations in temperature and for remotely checking the operation of the equipment against a known source of radiation.

These and other objects of the invention will become apparent from the following description in conjunction with the accompanying drawings, in which:

FIG. 1 is a perspective of apparatus in accordance with the present invention;
FIG. 2, a schematic diagram of the circuit;
FIG. 3, a section, to an enlarged scale, through one of the detector heads;
FIG. 4, a section on the line 4—4 of FIG. 3;
FIG. 5, a section on the line 5—5 of FIG. 4; and
FIG. 6, a fragmentary elevation, to an enlarged scale, of the resistor and thermal switch mounting.

Briefly stated, the monitor includes a central recorder station to which a multiplicity of detector heads may be connected, the circuitry including a high voltage power supply, range varying resistors, a photomultiplier tube with operatively mounted scintillation crystal, a thermostatically operated heater, and a known radiation source mounted for exposure to the detector at the will of a remote operator. The central recorder station is arranged to briefly and periodically connect with each of the detectors, thus reducing the fatigue effect exhibited by photomultipliers when operated at relatively high anode current.

With further reference to the drawings, a central station is provided with a recorder 10, which may be of the conventional well-known type having a multiplicity of channels, e.g. 10. The recorder is supplied with power from a suitable source and is connected by cables 11, 11' to detector heads 13, 13', etc., in remote locations. FIG. 2 illustrates schematically the circuitry for the recorder and connections to a single detector, it being understood that operation with a multiplicity of detectors is contemplated.

With reference to FIG. 2 a high voltage direct current line 20 is connected to a stepping switch 21 having a rotatable arm 22 which is driven by suitable means to step around and periodically and briefly engage contacts 23 within a selected period of time, for example, at one revolution per minute. From the contacts 23 a lead 25 is connected to switch arm 26 of a range varying device 28 having contacts 29 by means of which any of resistors 30 may be inserted in the power line 32. Hence, by operation of switch 26 the range for each recorder detector may be set.

Line 32 is connected to the anode of a photomultiplier tube assembly 34, which will be described in detail later. Output line 36 from the cathode of the tube is connected to a corresponding switch point 38 on signal switch 39, the point 38 being periodically contacted by rotating switch arm 40 connected to output line 41.

In the output line is a suitable resistor 43 across which leads 45 are connected to a suitable amplifier and the recording instrument.

Although the device is adapted for detecting various types of radiation, it is particularly suitable for monitoring gamma radiation.

Each of the detector heads 13, 13', etc., includes a sealed housing and an exposed cable connection. The illustrated housing is tubular and consists of a rear or socket section 50, intermediate section 51 and a front section 52 having a closed end 53. The intermediate and front sections are permanently joined and attached in threaded engagement to the rear section, with a seal such as O-ring 55 at the joint. Sections 51 and 52 can be removed from section 50 without disconnecting or disassembling other parts of the assembly.

In order to support the photomultiplier tube and associated parts, the socket section 50 has an intermediate wall 58 through which the cable cover 59 extends and has prongs 60 to which connection to cable 11 can be made through the opening 61 at the rear of the section.

Section 50 also has a front wall 62 with an opening 63 for receiving the socket 64 of a photomultiplier tube 65. The photomultiplier tube has a base 66 within which suitable voltage dropping elements are mounted, and a shield 67 which engages the base. The tube is of a type which responds to light received through its remote end. A crystal 70 is mounted at the end and has a wrapping 71 of metal foil or the like which effectively extends the shield 67 beyond the end of the tube in order to improve the operating characteristics of the tube by maintaining the potential of the shield throughout its length and that of the crystal, the shield being connected to the high voltage lead. At the outer end of the crystal 70 a standard source assembly 74 is mounted.

In order to mount the tube, crystal and standard source assembly on the front wall 62 of the section 50, the section has a plurality of rods 75 received in openings 76 which are spaced about the opening 63 of the wall. The shield 67 has a pair of spaced collars 78, 79 having radial flanges through which the rods 75 pass and are anchored thereto by fasteners 80. At the outer end of the crystal a collar 81 having a flange 82 receives the rods and is resiliently urged toward the tube 65 by springs 83 secured by adjustable fasteners 84. On the ends of the rods is a mounting plate 86 of the standard source assembly 74.

In order to maintain a substantially constant temperature of the photomultiplier tube, a plurality of resistors 90 are mounted between the spaced collars 78, 79 surrounding the tube and have leads 91 connected through a thermostat switch 92 to lines 93 which are carried through the cable to a suitable source of power. The thermostatic switch is arranged to maintain the photomultiplier tube at a temperature sufficiently high for it to operate satisfactorily, say approximately 110°–115° F., thus assuring accurate response of the device in locations at which the temperature would normally drop below such desired operating level.

In order to be able to check and calibrate the operation of the photomultiplier tube the standard source assembly 74 is provided.

The standard source assembly includes a backing plate 86 having a rod 95 at the end of which a known standard source 96 is mounted. Interposed between the standard source and the scintillation crystal is a disk shield 97 which is rotatably mounted on, not keyed to, a shaft 97'. The shaft extends from a rotary solenoid 98 mounted on the backing plate and has a return spring 99.

The disk has a plurality of angularly spaced exposure apertures 100, four being illustrated, and twice as many spaced stepping notches 102 on its periphery. Mounted on the backing plate is a limit spring 104 having an inclined detent 105 for engaging the notches and spaced therefrom is a leaf stepping spring 106 having a detent 107 for engaging the notches.

Mounted on the shaft is a stepping spring lifter 110 having a curved camming surface 111. Shaft 97' has a ratchet 112 slidably keyed thereto and yieldably urged into engagement with the teeth of sleeve 113 of the disk which rotates freely on the shaft by spring 113'. The teeth of the ratchet and sleeve are disposed at an angle so that during rotation caused by energization of the solenoid, the ratchet rides over the teeth of the sleeve but positively drives during return rotation in the opposite direction. The solenoid is connected by suitable leads 94 in the cable to a power source through switch 114 at the central station.

In the operation of the device the recorder switch arms 22 and 40 rotate to make periodic contact with each of the switch points. The signal from the detectors results in a voltage drop across leads 45 which is recorded on the instrument sheet 115.

Since each detector is energized periodically for only a brief interval, the inherent drift of the photomultiplier tube is obviated.

During operation the resistors 90 controlled by the thermostatic switch 92 maintain the temperature of the detector above a predetermined minimum.

At any time the operator may check and calibrate the operation of the device by operating the standard source mounting assembly, as follows: When switch 114 is depressed the rotary solenoid is energized to drive the shaft 97' counterclockwise, as viewed in FIG. 5. This results in lifter 110 raising stepping spring 106 and the detent 107 from engagement with the notch 102 of the disk. At the same time, any tendency of the disk to rotate counterclockwise is resisted by detent 105 of the spring 104. Rotation of the solenoid is limited by the lifter engaging one of the rods 75. Upon releasing the solenoid switch the return spring 99 rotates the solenoid back to its previous position, the ratchet 112 engaging the sleeve 113 of the disk and causing it to rotate and becoming latched in the next position by engagement of spring 107 with the next notch 102 of the disk.

After the operation is checked, the solenoid is energized once more to cause the disk to rotate to the position in which the shield blocks the source from the tube, the apertures 100 being spaced apart so that the disk alternately shields and exposes the standard source with each succeeding operation of the solenoid.

The device permits the monitoring of various areas, for example, inside and outside of a reactor assembly in which the radiation and temperature may vary widely. However, appropriate ranges may be set for individual detector heads so that a single recording instrument may make a record of the levels of radiation at frequent levels.

The device is ruggedly mounted in a metal housing and is thus adapted to sustain the effects of shocks as may occur. Such rugged mounting also permits the detectors to be mounted on posts or pipes at an elevation above the surface of the ground in order to sense the radiation at various heights.

Due to the fact that a direct current system is used, voltage drops over relatively large distances such as a mile are negligible, thus permitting monitoring of remote areas without compensating equipment.

The direct current high voltage power supply may be of conventional type to provide 1,500 volts variable regulated direct current. The recorder may be of conventional type, such as that produced by Brown Instrument Company. This instrument has a high voltage switch and includes a wiper or stepping switch arm driven through gears by an electric motor step by step at about 1 r.p.m. and a signal switch geared to turn as the high voltage switch turns so that the two step around together. The instrument also has a recorder amplifier of the direct current type and a recording sheet which plots the voltage from zero to 10 millivolts.

The detector photomultiplier may be a Dumont 6292 and the crystal a cylindrical "Pilot Scintillator B" of Pilot Chemicals, Inc.

Accordingly, it will be observed that the present invention includes the combination of a recording instrument connected to a multiplicity of detectors of the direct current scintillation type, each of which has a photomultiplier tube and a crystal mounted within a sealed housing and having condition responsive heaters and a testing and calibrating source which may be operated at will.

It will be obvious to those skilled in the art that various changes may be made in the described embodiment of the invention without departing from the spirit and scope thereof and therefore the invention is not limited to that which is illustrated in the drawings and described in the specification, but only as indicated in the accompanying claims.

What is claimed is:

1. A detector head comprising a hollow housing having a rear section and a forward section, said rear section having an end wall with a large central aperture and a plurality of relatively small apertures spaced around said central aperture, said rear section having an intermediate wall with an aperture, the other end of said section being open, a plurality of support rods mounted in said small apertures and extending longitudinally within the forward section of the housing, a photomultiplier tube having its base mounted in the aperture in the end wall of the rear section and extending within the forward section, a shield on said photomultiplier tube, means for connecting the shield to the high voltage lead, collars on said photomultiplier tube shield and engaged by said rods, a scintillation crystal positioned at the end of said photomultiplier tube, shielding means on said crystal and contacting the tube shield, means carried by said rods and yieldably supporting said scintillation crystal, a support plate mounted at the ends of the rods, a standard radiation source mounted on said support plate and extending into proximity to said crystal, a rotary solenoid mounted on said support plate and having a shaft extending toward said crystal, a disk rotably mounted on said shaft and having angularly spaced apertures whereby rotation of said shaft will alternately expose and shield said source from said crystal, said disk mounting means including a collar having one-direction drive gear teeth, said shaft having a sleeve keyed thereto and having one-direction drive gear teeth adapted to engage the teeth of said disk collar, means yieldably urging said disk collar into engagement with the teeth of said keyed sleeve, said disk having spaced notches in its periphery, a first spring adapted to positively engage one of said notches and prevent rotation of said disk in either direction, a second spring adapted to engage another of said notches and prevent rotation of said disk in one direction, lifter means for said first spring mounted on said shaft and means for returning said solenoid back to its initial position, whereby energization of said solenoid rotates said lifter means and said keyed sleeve in said one direction in which said lifter raises said first spring from engagement with the disk, said gear teeth riding over one another and rotation of said disk being prevented by said second spring and whereby, when said solenoid is deenergized, said return means rotates the solenoid back to its initial position with said gear teeth engaged in driving position to rotate the disk through a unit of revolution.

2. A detector head comprising a hollow housing, having a wall with a large central aperture and a plurality of relatively small apertures spaced around said central aperture, a plurality of support rods mounted in said small apertures and extending longitudinally within the housing, a photomultiplier tube having its base mounted in the central aperture and extending within the housing, supports on said photomultiplier tube and engaged by said rods, a scintillation crystal positioned at the end of said photomultiplier tube, means carried by said rods and supporting said scintillation crystal, a support plate mounted at the ends of the rods, a standard radiation source mounted on said support plate and extending into proximity to said crystal, a rotary solenoid mounted on said support plate and having a shaft extending toward said crystal, a disk rotatably mounted on said shaft between the crystal and source and having angularly spaced openings whereby rotation of said shaft will alternately expose and shield said source from said crystal, said disk mounting means including a collar having one-direction drive gear teeth, said shaft having a sleeve keyed thereto and having one-direction drive gear teeth adapted to engage the teeth of said disk collar, means yieldably urging said disk collar into engagement with the teeth of said keyed sleeve, first means adapted to engage said disk and prevent rotation in either direction, second means adapted to engage said disk and prevent rotation in one direction, disabling means for said first means mounted on said shaft and means for returning said solenoid back to its initial position, whereby energization of said solenoid rotates said disabling means and said keyed sleeve in said one direction in which said disabling means disables said first means, said gear teeth riding over one another and rotation of said disk being prevented by said second means, and whereby, when said solenoid is deenergized, said return means rotates the solenoid back to its initial position with said gear teeth engaged in driving position to rotate the disk through a unit of revolution.

3. A detector head comprising a hollow housing, a photomultiplier tube mounted in the housing, a scintillation crystal positioned at the end of said photomultiplier tube, a support mounted at the end of the tube, a standard radiation source mounted on said support and extending into proximity to said crystal, a rotary solenoid mounted on said support and having a shaft extending toward said crystal, a disk rotatably mounted on said shaft and having angularly spaced apertures whereby rotation of said shaft will alternately expose and shield said source from said crystal, said disk mounting means including a collar having one-direction drive gear teeth, said shaft having a sleeve keyed thereto and having one-direction drive gear teeth adapted to engage the teeth of said disk collar, means yieldably urging said disk collar into engagement with the teeth of said keyed sleeve, said disk having spaced notches in its periphery, a first spring adapted to positively engage one of said notches and prevent rotation of said disk in either direction, a second spring adapted to engage another of said notches and prevent rotation of said disk in one direction, lifter means for said first spring mounted on said shaft and means for returning said solenoid back to its initial position, whereby energization of said solenoid rotates said lifter means and said keyed sleeve in said one direction in which said lifter raises said first spring from engagement with the disk, said gear teeth riding over one another and rotation of said disk being prevented by said second spring and whereby, when said solenoid is deenergized, said return means rotates the solenoid back to its initial position with said gear teeth engaged in driving position to rotate the disk through a unit of revolution.

4. A detector head comprising a housing, a photomultiplier tube mounted in the housing, a scintillation crystal positioned at the end of said photomultiplier tube, a support mounted at the end of the tube, a standard radiation source mounted on said support and extending into proximity to said crystal, rotary means mounted on said support and extending toward said crystal, a disk rotatably mounted on said means between the crystal and source and having angularly spaced apertures whereby rotation of said disk will alternately expose and shield said source from said crystal, said disk mounting means including a one-direction drive, said rotary means having a one-direction drive adapted to engage the one-direction drive of said disk mounting, a first means adapted to prevent rotation of said disk in either direction, a second means adapted to prevent rotation of said disk in one direction, disabling means for said first means and means for returning said rotary means back to its initial position, whereby energization of said rotary means rotates said disabling means and said rotary means in said one direction in which said disabling means disables said first means, said one-direction drives riding over one another and rotation of said disk being prevented by said second means and whereby, when said rotary means is deenergized, said return means rotates the rotary means back to its initial position with said one-direction drives engaged in driving position to rotate the disk through a unit of revolution.

5. A radiation monitor comprising a central station and a plurality of remote detectors, said central station comprising a recording instrument, said recording instrument having a high voltage stepping switch for connecting a high voltage supply periodically and sequentially to said remote detectors and having a signal switch connected to drive in step with said stepping switch and to connect return lines periodically and sequentially from said detectors, said recorder having means for indicating and making a record of the output from the remote detectors received through said signal switch, said detectors each comprising a photomultiplier tube and scintillation crystal arranged so that light from said crystal is received in said tube, the output from said high voltage supply being connected via said stepping switch to the anodes of the respective tubes, the cathodes of the respective tubes being connected to the signal switch, a source of known radiation mounted adjacent to the crystal, and means for alternately exposing and shielding said known source from said crystal, said means being operable from a remote location.

References Cited by the Examiner

UNITED STATES PATENTS

| | | | |
|---|---|---|---|
| 2,433,554 | 12/1947 | Herzog | 250—83.6 |
| 2,646,556 | 7/1953 | Allen | 250—83.6 |
| 2,676,268 | 4/1954 | Schorr | 250—71.5 |
| 2,761,071 | 8/1956 | Hurst | 250—83 |
| 2,911,534 | 11/1959 | Brannon | 250—71.5 |
| 2,951,158 | 8/1960 | Wouters | 250—71.5 |
| 2,952,774 | 9/1960 | Howard | 250—71.5 |
| 3,084,251 | 4/1963 | Goupil | 250—71.5 X |

RALPH G. NILSON, *Primary Examiner.*

GEORGE R. OFELT, JAMES W. LAWRENCE,
*Examiners.*